Aug. 4, 1970   H. MARONDE   3,522,611

PHOTOGRAPHIC TRAFFIC MONITORING DEVICE

Filed July 10, 1968

INVENTOR:

HERBERT MARONDE

BY
Darbo, Robertson &
Vandenburgh  Attys.

United States Patent Office 3,522,611
Patented Aug. 4, 1970

3,522,611
PHOTOGRAPHIC TRAFFIC MONITORING
DEVICE
Herbert Maronde, Dusseldorf, Germany, assignor of one-half to Robot Foto und Electronic G.m.b.H. & Co. K.G., Dusseldorf-Benrath, Germany
Filed July 10, 1968, Ser. No. 743,817
Claims priority, application Germany, July 18, 1967, R 46,511
Int. Cl. G01d 9/42; G01s 9/44; G03b 17/24
U.S. Cl. 346—107         9 Claims

ABSTRACT OF THE DISCLOSURE

A traffic camera is mounted on a housing and has a lens outside the housing to photograph a street scene and a lens in the housing to photograph time, date and speed indicating instruments. The housing has interchangeable inserts for the speed indicating instrument, one of which carries a speedometer and the other of which carries a radar-controlled speed indicator. A light in the housing is obscured from the latter when it is in place.

BACKGROUND OF THE INVENTION

The present invention relates to a photographic traffic monitoring device to be mounted in a monitoring vehicle having a camera with automatic film advance and shutter winding, adapted to photograph the street picture. Cameras are known which, by means of an auxiliary objective, simultaneously photograph a secondary image reflected into the image field, of instruments indicating time, date and driving speed, the instruments being accommodated in a housing carrying the camera, and illuminated by an auxiliary light source. Usually, a speedometer connected to the monitoring vehicle is used as driving speed indicator, traffic monitoring being effected in a manner such that the monitoring vehicle follows a vehicle at same speed and by photographing the vehicle and the speedometer together with time and date establishes documentary proof of a speed transgression. On the other hand, it is known to measure the driving speed of a vehicle by a stationary radar installation and together with the vehicle photograph a radar-controlled indicating device.

It is the object of the present invention to design a photographic traffic monitoring device in a manner such that it may be used both for a pursuing and also for a stationary traffic monitoring, whereas hitherto, two different installations had to be used for this purpose. According to the invention this object is attained by providing that the speedometer is adapted to be exchanged by a radar-controlled indicating instrument, by maintaining the plane of the object. Expediently, the invention is realized in that the speedometer and the radar-controlled indicating instrument are each mounted on a similar housing insert. The insert which carries the speedometer is provided with a readily releasable connection for the speedometer drive and the insert carrying the radar-controlled indicating instrument is provided with a plug board. Conversion of the monitoring device therefore is possible with few manipulations, without having to avail of an expert's service.

Of course, with the radar-controlled indicating device it also is necessary to photograph time and date indicators, which require an auxiliary light source. In further modification of the invention provision may be made that the radar-controlled indicating instrument consists of self-luminous indicator tubes screened against the auxiliary light source by a stop controllable by its insert. Generally, the traffic monitoring device is supplied from the vehicle battery, mostly voltage-sensitive circuit arrangements being used, for instance for the setting of the exposure time of the secondary image. As the voltage of the vehicle battery is known to be slightly higher during driving than when the vehicle is standing, provision may be made that additional electric circuit elements used for a voltage compensation, are connectable with the inert of the radar-controlled indicating instrument.

SUMMARY OF THE INVENTION

The present invention relates to a traffic camera having interchangeable speed indicators.

DESCRIPTION OF THE SPECIFIC EMBODIMENT

Figure 1:
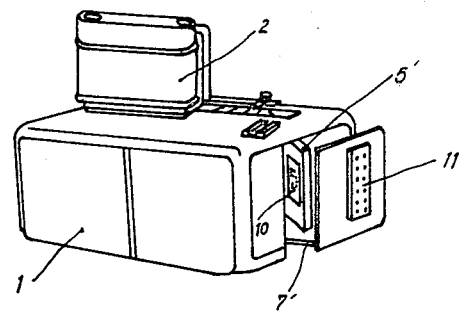
FIG. 1 is a perspective view of an embodiment of the invention, with one insert partially withdrawn.
Figure 2:
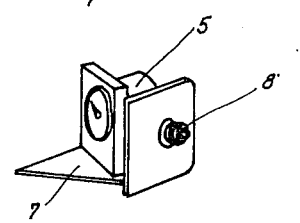
FIG. 2 is a perspective view of one insert separated from the housing.
Figure 3:
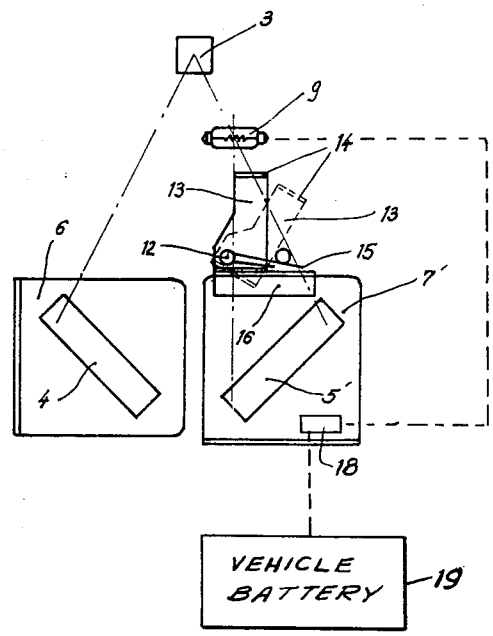
FIG. 3 is a schematic plan view of the inserts, optical arrangement and illumination system.

The monitoring device is accommodated in a housing 1. It is adapted to be mounted above the instrument panel in front of the windshield of a monitoring vehicle, in a manner not illustrated. The housing 1 carries a camera 2 of known design having automatic film advance and shutter winding. The camera 2 is adapted in known manner so that a small secondary image formed by an auxiliary objective 3 accommodated inside of the housing 1 is reflected from below into the image field. The auxiliary objective 3 images two instruments 4 and 5 arranged in the housing 1 in angular relationship to each other and symmetrically to the optical axis of the auxiliary objective. Instrument 4 indicates time and date. Both instruments 4, 5 are mounted on one housing insert 6, 7 each. Each housing insert 6, 7 is alternatively insertable into the housing 1 from the side. Instrument 5 is a speedometer, and its driving shaft is connected to the speedometer drive (not shown) of the monitoring vehicle by a readily releasable connection 8. Both instruments 4, 5 are illuminated by a light source 9 accommodated in the housing 1. Now, the monitoring device is adapted so that, instead of the housing insert 7 comprising the speedometer 5, a similar housing insert 7' is insertable carrying a radar-controlled indicating instrument 5'. This indicating instrument 5' consists of self-luminous indicator tubes 10 which are disposed in the same object plane as was previously the speedometer, so that the indicator tubes 10 are also imaged sharply by the auxiliary objective 3. On its outer surface the housing insert 7' carries a plug board 11 used to connect the indicating instrument 5' to a radar detector unit, not shown.

In the bottom of housing 1, an angle plate 13 is pivotally affixed as at 12. The vertical arm 14 of plate 13 serves as a light stop. Normally, the angle plate 13 is urged by a spring 15 into the dotted position, at which position the stop 14 does not cast a shadow onto the instrument 5. An abutment 16 is attached to the housing insert 7', by which the angle plate 13 is pivoted (when the insert 7' is put in place) against the urging of the spring 15 into a position (shown in full lines) such that the stop 14 casts a shadow onto the instrument 5' and onto the self-luminous indicator tubes 10, respectively. Thus, the stop 14 shades off the light of the light source 9 from the instrument 5', but allows the instrument 4 to remain illuminated and be photographed together with the self-luminous, not illuminated indicator tubes 10 as auxiliary image. The stop 14 does not obstruct the light from instrument 5' from reaching lens 3.

On the housing insert 7' carrying the radar-controlled indicating instrument 5', there may also be mounted in a manner not shown electric circuit elements 18 used only when the radar-controlled indicating instrument 5' is being used, but not used, when the speedometer 5 is being used, and which serve, for instance, to compensate for the different battery voltages present at the vehicle battery 19 when the monitoring vehicle is driving and when it is standing.

Thus, the monitoring device hereinbefore described may be used with speedometer insert (7, 5) for a pursuing traffic monitoring, and after conversion with radar insert (7', 5') for a stationary traffic monitoring.

I claim:

1. In a traffic monitoring device adapted to be mounted on a monitoring vehicle having a battery and a speedometer drive and equipped with a radar detector, said device including a housing wtih a camera mounted thereon and adapted to photograph a street picture, which camera also has an auxiliary objective through which the camera simultaneously photographs a first instrument indicating time and date and a second, speed indicating, instrument, the improvement comprising:

said housing having a pair of interchangeable insert means usable in the housing one at a time; and a pair of said speed indicating instruments, one of said speed indicating instruments being mounted on one insert means and being a speedometer, the other of the speed indicating instruments being a radar-controlled speed indicator and being mounted on the other insert means;

whereby said device may be used interchangeably to photograph the speed as detected by the speed of the monitoring vehicle or as detected by radar.

2. In a monitoring device as set forth in claim 1, wherein the one insert means including a readily releasable connection means to connect the speedometer to the speedometer drive and the other insert including a plug board means to connect the radar-controlled speed indicator to said radar detector.

3. In a monitoring device as set forth in claim 2, including a light in said housing to illuminate said instruments, means to shade said light from said radar-controlled speed indicator when the other insert is placed in said housing; said radar-controlled speed indicator comprising self-luminous indicator tubes.

4. In a monitoring device as set forth in claim 3, wherein said shading means includes a shade mounted on an arm pivotally connected to the housing for movement between a first position at which the shade obscures the light from the instrument in the insert and a second position at which the shade does not obscure the light from the instrument on the insert, resilient means urging said shade to one of said positions, and means on a first of said inserts to move said shade, against said urging, to the other of said positions when the first insert is put into the housing.

5. In a monitoring device as set forth in claim 4, wherein said light is connected to said battery and including circuit element means connected to said light and mounted on said other insert for voltage compensation of said light when said other insert is in place in the housing.

6. In a monitoring device as set forth in claim 1, including a light in said housing to illuminate said instruments, means to shade said light from said radar-controlled speed indicator when the other insert is placed in said housing; said radar-controlled speed indicator comprising self-luminous indicator tubes.

7. In a monitoring device as set forth in claim 6, wherein said shading means includes a shade mounted on an arm pivotally connected to the housing for movement between a first position at which the shade obscures the light from the instrument on the insert and a second position at which the shade does not obscure the light from the instrument on the insert, resilient means urging said shade to one of said positions, and means on a first of said inserts to move said shade, against said urging, to the other of said positions when the first insert is put into the housing.

8. In a monitoring device as set forth in claim 7, wherein said light is connected to said battery and including circuit element means connected to said light and mounted on said other insert for voltage compensation of said light when said other insert is in place in the housing.

9. In a monitoring device as set forth in claim 6, wherein said light is connected to said battery and including circuit element means connected to said light and mounted on said other insert for voltage compensation of said light when said other insert is in place in the housing.

References Cited

UNITED STATES PATENTS 3,206,748   9/1965   Miller _____ 343—8

RODNEY D. BENNETT, JR., Primary Examiner

T. H. TUBBESING, Assistant Examiner

U.S. Cl. X.R.

95—1.1; 343—8